US011913418B2

(12) United States Patent
Von Gaisberg-Helfenberg et al.

(10) Patent No.: US 11,913,418 B2
(45) Date of Patent: Feb. 27, 2024

(54) METHOD FOR STARTING AN INTERNAL COMBUSTION ENGINE OF A MOTOR VEHICLE

(71) Applicant: Mercedes-Benz Group AG, Stuttgart (DE)

(72) Inventors: Alexander Von Gaisberg-Helfenberg, Beilstein (DE); Dietmar Schroeer, Weissach im Tal (DE); Thomas Stolk, Kirchheim (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/005,277

(22) PCT Filed: Jun. 23, 2021

(86) PCT No.: PCT/EP2021/067054
§ 371 (c)(1),
(2) Date: Jan. 12, 2023

(87) PCT Pub. No.: WO2022/012882
PCT Pub. Date: Jan. 20, 2022

(65) Prior Publication Data

US 2023/0250788 A1 Aug. 10, 2023

(30) Foreign Application Priority Data

Jul. 13, 2020 (DE) ..................... 10 2020 004 191.4

(51) Int. Cl.
*F02N 19/00* (2010.01)
*F02N 11/08* (2006.01)

(52) U.S. Cl.
CPC ............ *F02N 19/005* (2013.01); *F02N 11/08* (2013.01)

(58) Field of Classification Search
CPC ..................................................... F02N 19/005
See application file for complete search history.

(56) References Cited

U.S. PATENT DOCUMENTS

2005/0056239 A1* 3/2005 Hirano .................. F02B 75/044 123/48 B
2009/0205331 A1* 8/2009 Marsh ..................... F02B 33/44 60/599

(Continued)

FOREIGN PATENT DOCUMENTS

DE 10 2004 006 337 A1 8/2005
DE 10 2006 012 384 A1 9/2007

(Continued)

OTHER PUBLICATIONS

PCT/EP2021/067054, International Search Report dated Sep. 16, 2021 (Two (2) pages).

(Continued)

*Primary Examiner* — John Kwon
(74) *Attorney, Agent, or Firm* — Crowell & Moring LLP

(57) ABSTRACT

A method for starting an internal combustion engine of a motor vehicle includes detecting before a direct starting of the internal combustion engine that a piston which is disposed translationally moveably in a start cylinder of the internal combustion engine is in an upper half of, or in a middle of, a stroke of the piston. In response to the detecting, rotating an output shaft of the internal combustion engine in a direction of rotation of the output shaft such that the piston is in a lower half of the stroke of the piston and in an intermediate position. The method further includes rotating the output shaft in a second direction of rotation before and/or during fuel being first directly injected into the start cylinder such that the piston is moved out of the intermediate position in a direction of an upper dead center of the piston.

7 Claims, 1 Drawing Sheet

(56) References Cited

U.S. PATENT DOCUMENTS

| | | | | |
|---|---|---|---|---|
| 2010/0024763 | A1* | 2/2010 | Sparling | F02B 57/10 123/200 |
| 2016/0341145 | A1* | 11/2016 | Yasuda | F02D 41/06 |
| 2017/0030287 | A1* | 2/2017 | Matsunaga | F02D 41/065 |
| 2023/0167795 | A1* | 6/2023 | Von Gaisberg-Helfenberg | F02N 5/02 123/185.14 |
| 2023/0212962 | A1* | 7/2023 | Von Gaisberg-Helfenberg | F01L 1/047 123/90.17 |

FOREIGN PATENT DOCUMENTS

| | | |
|---|---|---|
| DE | 10 2007 058 227 A1 | 6/2009 |
| DE | 10 2009 001 317 A1 | 9/2010 |
| DE | 10 2011 075 221 A1 | 11/2012 |
| DE | 10 2015 226 623 A1 | 6/2017 |
| DE | 10 2016 206 726 A1 | 10/2017 |

OTHER PUBLICATIONS

German-language German Office Action issued in German application No. 10 2020 004 191.4 dated Jul. 31, 2020 (Five (5) pages).
English Machine Translation of DE 10 2006 012 384 A1, (18 pages).

* cited by examiner

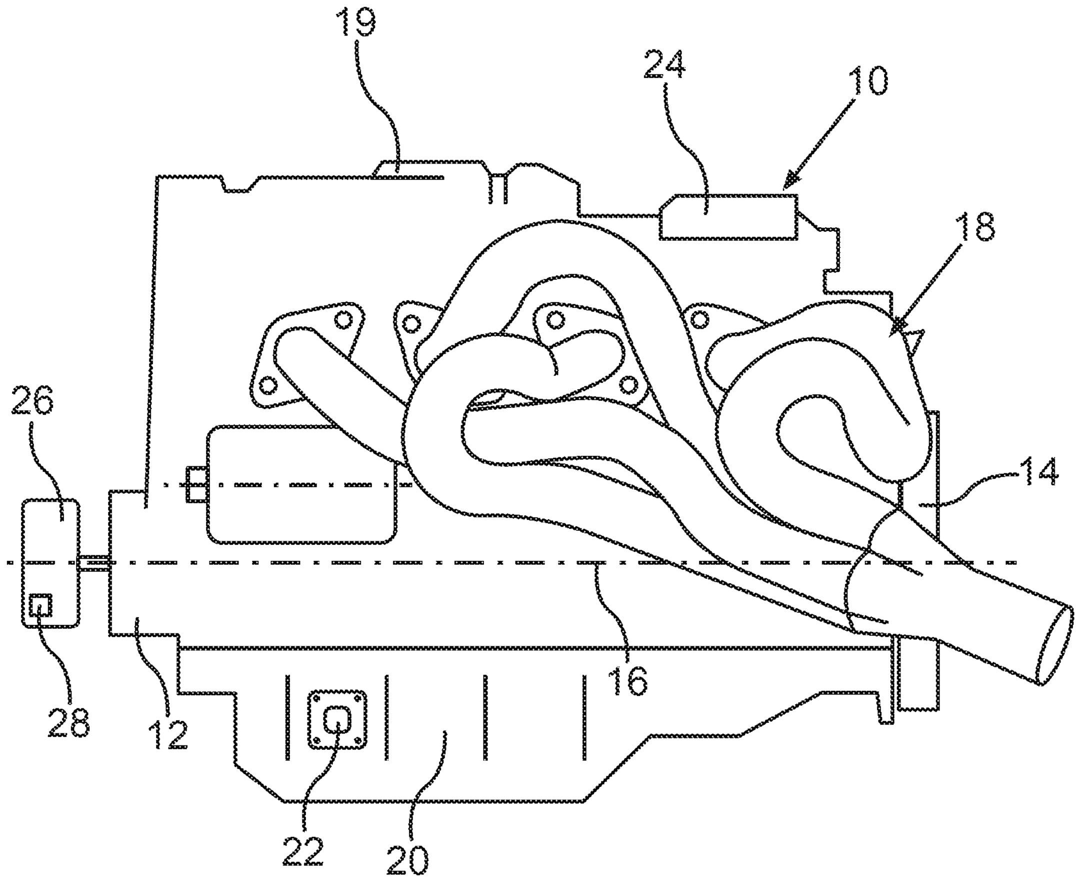
19
24
10
18
26
14
16
28
12
22
20

METHOD FOR STARTING AN INTERNAL COMBUSTION ENGINE OF A MOTOR VEHICLE

BACKGROUND AND SUMMARY OF THE INVENTION

The invention relates to a method for starting an internal combustion engine of a motor vehicle, in particular of a motor car.

DE 10 2009 001 317 A1 discloses a device for starting an internal combustion engine, wherein an energy store is provided, which saves the remaining rotational energy of the internal combustion engine during powering down, and releases it during renewed saving to rotate the crankshaft in the opposite direction. A starting method for a hybrid vehicle should be taken as known from DE 10 2006 012 384 A1. A method for operating a combustion engine is known from DE 10 2007 058 227 A1. Furthermore, DE 10 2016 206 726 A1 discloses a method for starting a four-stroke internal combustion engine. A device for the angular adjustment of a crankshaft of a combustion engine is also known from DE 10 2004 006 337 A1.

The object of the present invention is a method for starting an internal combustion engine of a motor vehicle, so that the internal combustion engine can be started in an especially advantageous way, in particular by direct starting.

The invention relates to a method for starting an internal combustion engine of a motor vehicle, in particular of a motor car, for example formed as a passenger motor car, that is formed as a reciprocating piston engine. The internal combustion engine is also referred to as a combustion engine, motor or combustion motor. In the method, the initially deactivated internal combustion engine is started by direct starting, the output shaft of the engine rotates in a direction of rotation relative to a housing element of the internal combustion engine during fired operation for driving the motor vehicle, for example following the starting of the internal combustion engine or resulting from the starting. In other words, in its fully manufactured state, the motor vehicle has the internal combustion engine that has the output shaft that is, for example, formed as a crankshaft. The internal combustion engine also has the housing element, which is, for example, a cylinder housing, in particular a cylinder crank housing. If the internal combustion engine is deactivated, then no combustion processes are taking place in the internal combustion engine, in particular not in its combustion chambers, which could drive the output shaft, and the output shaft is stationary if internal combustion engine is deactivated. In other words, the output shaft is at a standstill if the internal combustion engine is deactivated. Preferably, the internal combustion engine has several combustion chambers. During the previously mentioned fired operation of the internal combustion engine, combustion processes take place in the internal combustion engine, in particular in the combustion chamber, by means of which the crankshaft is driven and thus rotated in the direction of rotation relative to the housing element. This direction of rotation is also referred to as the normal direction of rotation or the normal operational direction of rotation and is a normal direction of rotation in which the output shaft rotates in fired operation and in a normal operation of the internal combustion engine. During fired operation and thus while the output shaft rotates in the direction of rotation relative to the housing element, the internal combustion engine can provide torque to power the motor vehicle by means of the output shaft. Starting, in particular direct starting, is understood to mean that the initially inactive internal combustion engine is started and thus activated, i.e., is transitioned from its deactivated state to its activated state or to its fired operation. In particular, starting, in particular direct starting, is understood to mean that the output shaft that is initially stationary or at a standstill is accelerated or powered out of its standstill and is thus set in rotation, so that as a result of the starting, combustion processes occur in the combustion chamber or in the combustion chambers of the internal combustion engine, by means of which the output shaft is driven and is thereby rotated in the direction of rotation relative to the housing element.

Direct starting is in particular to be understood to mean that the output shaft is not dragged out of its standstill to a starting speed of several hundred rotations per minute by means of an auxiliary drive device provided in addition to the internal combustion engine, for example an electric motor, and is thereby rotated in the direction of rotation, but rather in direct starting, a, for example liquid or alternatively gaseous, fuel is first directly injected into a start cylinder of the internal combustion engine, wherein for example in direct starting, the output shaft is brought up to a speed of several hundred rotations per minute exclusively by means of combustions occurring in the internal combustion engine or in its combustion chambers. The start cylinder of the internal combustion engine should be understood to be such a cylinder into which, relative to all the cylinders of the internal combustion engine, the fuel is first injected during direct starting. Only after this injection of the fuel into the start cylinder is the fuel also directly injected into the at least one further cylinder of the internal combustion engine. The previously mentioned combustion chamber or one of the previously mentioned combustion chambers of the internal combustion engine is thus partially formed or defined by the start cylinder. Regarding the several combustion chambers and the several combustion chamber cylinders, it is provided that the cylinders each partially form or define one of the combustion chambers.

It is preferably provided that the starting or the direct starting of the method according to the invention is immediately or directly followed by a deactivation, also referred to as stopping or switching off, of the initially activated internal combustion engine. This is in particular to be understood to mean that, between the stopping of the internal combustion engine and the chronologically subsequent starting of the internal combustion engine, a further starting or stopping of the internal combustion engine is omitted. Deactivation or stopping of the internal combustion engine is in particular to be understood to mean that the internal combustion engine that was initially activated and is thus in its firing operation is deactivated, i.e., it is stopped, whereby combustion processes for driving the output shaft that take place in the internal combustion engine are ended. A so-called run-out of the output shaft results from this, the output shaft rotating still further in the direction of rotation relative to the housing element as part of its run-out after the ending of the combustion processes, in particular due to its inaction, until the output shaft ultimately reaches a standstill. Thus the run-out or the phase-out of the output shaft ends, for example, by reaching a standstill of the output shaft. Here, the feature that the starting of the internal combustion engine follows immediately on from the stopping should in particular be understood to mean that, between achieving the standstill of the output shaft and the starting of the internal combustion engine, a further starting of the internal combustion engine is omitted.

In order to be able especially advantageously start the initially deactivated internal combustion engine by direct start, in particular after the stopping that preceded the starting and in particular after the output shaft had achieved a standstill as a result of the stopping that preceded the starting, it is provided according to the invention that, if it is detected before the direct start, and thus after the stopping or after the output shaft had achieved its standstill as a result of the stopping that preceded the starting and while the output shaft is still stationary, i.e., while the output shaft is still at the resulting standstill that preceded the starting, that a piston which is arranged translationally moveably in the start cylinder into which the fuel is first directly injected in direct starting is in the upper half or in the middle of its piston stroke, the initially stationary output shaft is rotated, by means of an auxiliary drive device provided in addition to the internal combustion engine and also referred to as an auxiliary drive, out of its standstill in the direction of rotation, i.e., in the normal direction of rotation in such a way or so far that, as a result of the rotation of the output shaft effected by means of the auxiliary drive device, the piston is in the lower half of its piston stroke, whereupon the fuel is first directly injected into the start cylinder during starting the internal combustion engine. In other words, after the piston has been moved into the lower half of the piston stroke by the rotation effected by means of the auxiliary drive device and while the piston is in the lower half, in particular is stationary in the lower half, the fuel is first directly injected into the start cylinder during direct starting, in order to carry out the direct starting, i.e., to start the internal combustion engine by means of direct starting.

By piston stroke, the upper half and the lower half, as well as the middle of the piston stroke, the following should in particular be understood: the piston arranged in the start cylinder and thus also referred to as the start piston is translationally moveably incorporated in the start cylinder and can thus translationally move in the start cylinder and for example relative to the housing element between a lower dead center and an upper dead center. On its way from its lower dead center to its upper dead center, the piston carries out its piston stroke, also simply referred to as its stroke. The piston stroke is thus a or the distance from the lower dead center to the upper dead center or vice versa, wherein the distance runs parallel to the longitudinal direction of the cylinder or the central axis of the cylinder. The middle of the piston stroke is therefore the center of the named distance, so that the lower half of the piston stroke extends from the lower dead center to the center, inclusive. Accordingly, the upper half of the piston stroke extends from the center to the upper dead center, inclusive. The feature that the piston is in the middle of the piston stroke can thus be understood that the piston has, starting from its upper dead center or starting from its lower dead center, covered exactly half the distance or half the piston stroke. If the piston is in the upper half of the piston stroke, then the piston occupies a first piston position, which is also referred to as a first intermediate position, and is between the middle of the piston stroke and the upper dead center or is the upper dead center. If the piston is in the lower half of the piston stroke, then the piston occupies a second piston position, which is also referred to as a second intermediate position, and is between the middle of the piston stroke and the lower dead center or is the lower dead center. The upper half of the piston stroke is also referred to as the first half and the lower half of the piston stroke is also referred to as the second half. The previous and following statements can be applied to any design of a reciprocating piston internal combustion engine without any problems. In particular, the previous and following statements can be applied to both internal combustion engines in an in-line construction and to internal combustion engines in a V-type construction and in a box-type construction.

The following knowledge in particular underlies the invention: the output shaft can, as a result of the stopping, run out in such a way that the output shaft has or assumes, in its standstill resulting from the stopping, such a position of rotation that the piston in the start cylinder is in the upper half of its piston stroke or in the middle of the piston stroke. Then, only a low amount of air or only a low volume of air can be accommodated in the start cylinder or in the combustion chamber of the internal combustion engine that is in each case partially defined by the start cylinder and by the pistons arranged in the start cylinder, which amounts to half or less than half of the maximum possible volume of air. The maximum possible volume of air can for example then be accommodated in the start cylinder if the cylinder included in the start cylinder is at its lower dead center.

If only a low amount of air or only a low volume of air is accommodated in the start cylinder, then only a low amount of fuel can be burnt in the start cylinder, or this leads to excessive, undesirable emissions. By injecting the fuel into the start cylinder, a mixture of fuel and air, also referred to as the mixture, is formed, which comprises the air accommodated in the start cylinder and the fuel that is directly injected into the start cylinder. During direct starting or to carry out direct starting and thus start the internal combustion engine, the mixture is ignited. If then only a low amount of air is accommodated in the start cylinder, so that only a low amount of fuel can be inserted into the start cylinder, then, in particular if the internal combustion engine has a low temperature, the energy released by the ignition of the mixture may, if applicable, not be sufficient to then overcome a heightened friction resulting from the low temperature if the internal combustion engine is very cold and accordingly only has a low temperature, and to compress an amount of air into a further cylinder that is to be ignited so far that this further cylinder or a further piston arranged on the further cylinder can pass its upper ignition dead center (Zündtotpunkt, ZOT). Therefore, if applicable, the further cylinder cannot be ignited, and this can lead to a failed start. This is in particular to be understood to mean that the direct starting is not successful and does not lead to starting the internal combustion engine. A renewed direct starting is then, if applicable, not possible, since there is then no more air, only exhaust gas, in the start cylinder, which is also referred to as the first cylinder, the exhaust gas resulting from the ignition and combustion of the mixture in the start cylinder.

The above-mentioned problems and disadvantages can now be avoided by means of the invention. The internal combustion engine is fitted with the auxiliary drive device, which rotates the output shaft further in the normal direction of rotation after the stopping, also referred to as stop or motor stop, i.e., after the output shaft has reached its standstill, whereby the piston is moved into the upper half of the piston stroke and thereby is moved into the second intermediate position. The piston is thereby in the lower half of the piston stroke after the motor stop or in the second intermediate position, which is preferably different from the lower dead center, and thus is near its lower dead center. The gas exchange valves that are allocated to the start cylinder, in particular all the gas exchange valves allocated to the start cylinder, are closed here. However, for example in a first short period of time of the motor stop and/or after the motor stop, a pressure equalisation caused by leakage can, for example, occur between the start cylinder and surroundings of the internal combustion engine, in particular via the gas exchange valves. The start cylinder thereby fills with air, in particular until there is the same pressure in the start cylinder as in the surroundings. The pressure is also referred to as ambient pressure. Since the piston in the start cylinder is in the lower half of the piston stroke or in the second intermediate position, a significantly greater amount of air can be accommodated in the start cylinder in comparison to conventional solutions, so that in comparison to conventional solutions, a significantly greater amount of fuel can be directly injected into the start cylinder and as a result can be ignited and burnt. The above-mentioned further cylinder or the further piston can thereby especially reliably reach its upper ignition dead center and in particular surpass this, so that the internal combustion engine can be especially reliably started by means of the method according to the invention.

The auxiliary drive device used in the method according to the invention is in particular different from a conventional initiator in that the auxiliary drive device does not accelerate the output shaft to several hundred rotations per minute.

In order to be able to start the internal combustion engine especially reliably by direct starting, it is further provided that, before and/or during the fuel first being injected into the start cylinder during the direct starting, and thus after the piston has been moved into the second intermediate position by means of the rotation of the output shaft, effected by means of the auxiliary drive device and occurring in the direction of rotation, the output shaft is rotated in a second direction of rotation that is opposite to the direction of rotation by means of the auxiliary drive device, whereby the piston is moved out of the second intermediate position in the direction of its upper dead center. Due to this rotation of the output shaft against the first direction of rotation, the air accommodated in the start cylinder is condensed or compressed by means of the piston accommodated in the start cylinder, so that an especially advantageous ignition of the mixture in the start cylinder can be ensured.

In order to carry out the method according to the invention in an especially simple, cost- and weight-effective manner, it is provided in one embodiment that a complete rotation of the output shaft, effected by the auxiliary drive device, is omitted in the rotation of the output shaft in the direction of rotation that is effected by means of the auxiliary drive device and in the resulting movement of the piston into the second intermediate position. Preferably, the auxiliary drive device rotates the output shaft by at most 359 degrees, in particular by at most 269 degrees. The auxiliary drive device can thereby be configured to be significantly more cost, space- and weight-efficient compared to conventional initiators or starters. In the context of the method according to the invention, the starting is thereby carried out by direct starting in so far as the output shaft is not dragged from its standstill to several hundred rotations per minute by means of the auxiliary drive device, rather the auxiliary drive device effects less than one complete rotation of the output shaft in the direction of rotation, until the piston reaches the lower half of the piston stroke or the second intermediate position, whereupon a further rotation of the output shaft in the direction of rotation, effected by the auxiliary drive device, is omitted. The internal combustion engine is thereby started and the output shaft is then exclusively rotated in the direction of rotation by means of the combustions taking place in the internal combustion engine.

A further embodiment is characterized in that the output shaft is rotated in the direction of rotation by means of the auxiliary drive device in such a way that, as a result of the rotation of the output shaft in the direction of rotation, effected by means of the auxiliary drive device, the piston is in the lower half and in one of its positions that is different from its lower dead center as the second intermediate position, whereupon the fuel is first directly injected into the cylinder to start the internal combustion engine. The above mentioned second intermediate position is thus one of the positions of the piston in the start cylinder that is different from the lower dead center. The internal combustion engine can thereby be especially advantageously started by direct starting, after the piston had been moved into position by rotation of the output shaft in the direction of rotation. It has been shown to be especially advantageous that the position, in particular the second intermediate position, of the piston that is different from the lower dead center, is such a position of the piston that a translational movement of the piston from the position of the piston that is different from the lower dead center to the lower dead center of the piston leads to a rotation of the output shaft in the direction of rotation. Thus a driving and thereby a rotation of the output shaft in the direction of rotation can result, in an especially advantageous way, from the ignition and combustion of the mixture, so that the internal combustion engine can be especially advantageously started by direct starting.

It has been shown to be especially advantageous here if the rotation of the output shaft in the second direction of rotation effected by means of the auxiliary drive device omits a complete rotation of the output shaft. In other words, it is preferably provided that the auxiliary drive device rotates the output shaft by at most 197 degrees in the second direction of rotation. The costs, the space requirements and the weight can thereby be kept especially low, and the internal combustion engine can be started by means of true direct starting, without the output shaft being dragged out of its standstill to several hundred rotations per minute by means of an initiator.

In order to be able to rotate the output shaft especially appropriately and precisely, and thus to be able to move the piston especially appropriately and precisely into the position or into the intermediate position, it is provided in further embodiments of the invention that an electric motor is used as the auxiliary drive device.

In a further, especially advantageous embodiment of the invention, it is provided that the output shaft is rotated by means of the auxiliary device depending on at least one of the rotational positions of the output shaft, the rotational position of which is detected by a sensor. The output shaft can thereby, for example, be especially precisely rotated into a specifiable or predetermined rotational position, from which the mentioned position or intermediate position of the piston results.

A motor vehicle, preferably formed as a motor car, in particular a passenger motor car, which is configured for carrying out the method according to the invention, is also disclosed.

For example, the motor vehicle has the internal combustion engine, the auxiliary drive device and an electronic computing device, also referred to as the control unit, which is configured to drive the auxiliary drive device and the internal combustion engine in such a way, in particular to regulate or control them in such a way that the method is carried out according to the first aspect of the invention. Further advantages, features and details of the invention arise from the following description of a preferred exemplary embodiment or exemplary embodiments as well as based on the drawing. The features and combinations of features mentioned above in the description as well as the features and combinations of features mentioned hereinafter in the description of the FIGURE and/or only shown in the one FIGURE can be used not only in the respectively given combinations, but can also be used in other combinations or alone, without leaving the scope of the invention.

BRIEF DESCRIPTION OF THE DRAWING

The drawing shows a schematic side view of an internal combustion engine of a motor vehicle in the only FIGURE, the internal combustion engine of which is started by means of a method according to the invention.

DETAILED DESCRIPTION OF THE DRAWING

The one FIGURE shows an internal combustion engine 10 of a motor vehicle, formed as a reciprocating piston engine and also referred to as a combustion engine, motor or combustion motor, in a schematic side view. This means that the motor vehicle, preferably configured as a motor car, in particular as a passenger motor car, has the internal combustion engine 10 in its fully manufactured state and can be powered by means of the internal combustion engine 10. Therefore, the internal combustion engine 10 comprises a housing element 12 which can be a cylinder housing, in particular a cylinder crank housing. In addition, the internal combustion engine 10 comprises an output shaft 14 that is formed as a crankshaft, which is mounted on the housing element 12 rotatably around an axis of rotation 16 relative to the housing element 12. The housing element 12 has several cylinders, which each partially define a respective combustion chamber of the internal combustion engine 10. A respective piston is translationally moveably included in the respective cylinder. The internal combustion engine 10 also has a further housing element 19, for example formed as a cylinder head, which has or forms one combustion chamber roof per cylinder. The respective combustion chamber is thereby defined or formed in part by the respective cylinder, in part by the respective piston that is translationally moveably included in the respective cylinder, and in part by the associated combustion chamber roof.

The pistons included translationally moveably in the cylinders are pivotably connected to the output shaft 14 by respective connecting rods, so that the respective translational movement of the respective cylinder, which occurs relative to the housing element 12, can be or is converted into a rotation of the output shaft 14 that occurs around the axis of rotation 16, relative to the housing element 12. During fired operation, combustion processes occur in the respective combustion chamber and this in the respective cylinder, in each of which a mixture of fuel and air, also simply referred to as the mixture, is burnt. Exhaust gas results from this, which can flow out of the respective combustion chamber and flow into an exhaust system 18 or the internal combustion engine 10 and subsequently flow through the exhaust system 18.

The pistons are lubricated, for example by means of a lubricant, in particular by means of an oil, which can gather in an oil pan 20 of the internal combustion engine 10, in particular after the lubrication of the pistons. The internal combustion engine 10 here has a temperature sensor 22, also simply referred to as a sensor, by means of which a temperature of the lubricant, in particular in the oil pan 20, can be detected or is detected. An electronic computing device 24, also referred to as a control unit or engine control unit, is additionally provided, by means of which the internal combustion engine 10 is operated, in particular controlled or regulated.

Fired operation is configured to power the motor vehicle, since the internal combustion engine 10 provides at least one torque via the output shaft 14 during its fired operation, by means of which the motor vehicle can be or is driven. During the fired operation of the internal combustion engine 10, provided or configured to drive the motor vehicle, the output shaft 14 rotates around the axis of rotation 16 relative to the housing element 12 in a direction of rotation that is also referred to as the first direction of rotation or as the normal direction of rotation.

In the following, a method for starting the initially deactivated internal combustion engine 10 is described by means of the FIGURE. As is explained in even more detail, exactly one of the several cylinders of the internal combustion engine 10 is referred to as the start cylinder. In the method, the initially deactivated internal combustion engine 10 is started by direct starting. In direct starting, a fuel, for example a liquid or gaseous fuel, is first introduced into the start cylinder, out of all the cylinders of the internal combustion engine 10, and to this end is directly injected. Only after the injection of the fuel into the start cylinder is the fuel also introduced and thereby directly injected into the other cylinder or other cylinders of the internal combustion engine 10. It is preferably provided that, during direct starting, the fuel is injected into the start cylinder, while a rotation of the output shaft 14 in the direction of rotation is omitted. By means of a direct injection of the fuel into the start cylinder, which occurs in direct starting, a mixture of fuel and air is formed in the start cylinder, from the fuel injected into the start cylinder and from air that is in the start cylinder.

In order to now be able to carry out direct starting especially advantageously and reliably, it is determined whether, before the direct starting and while the output shaft is stationary, the piston arranged translationally moveably in the start cylinder is in the upper half or in the middle of its piston stroke, the initially stationary output shaft respectively rotated so far in the direction of rotation (normal direction of rotation) out of its standstill by means of an auxiliary drive device 26 that is provided in addition to the internal combustion engine and is, for example, formed as an electric motor, in such a way that, as a result of the rotation of the output shaft 14 effected by means of the auxiliary drive device 26 and occurring in the direction of rotation, the piston arranged in the start cylinder is in the lower half of its piston stroke, whereupon the fuel is first directly injected into the start cylinder to start the internal combustion engine 10. Because the pistons are pivotably connected with the output shaft 14 by the connecting rods, a rotation of the output shaft 14 occurring around the axis of rotation 16 relative to the housing element 12 leads to the pistons in the cylinders being translationally moved relative to the housing element. This is used in the method, in that the output shaft 14 is rotated by means of the auxiliary drive device 26 in such a way that the piston included in the start cylinder and also referred to as the start piston comes into an intermediate position which is between the lower dead center and the middle of the piston stroke of the start piston and this is preferably one of the positions of the start cylinder that is different from the lower dead center.

From the FIGURE it can be identified that the auxiliary drive device 26, also referred to as the auxiliary drive, is arranged on an in particular forward end of the output shaft 14. The auxiliary drive is dimensioned appropriately to rotate the output shaft 14 into a desired and, for example, specifiable or predetermined position. The position is also referred to as the rotational position or crankshaft angle and causes the start piston to be in the intermediate position as a result of the rotation of the output shaft 14 that occurs in the direction of rotation. A sensor 28, for example configured as a rotational angle senor, is provided here, by means of which an angular position and thus the rotational position of the output shaft 14 can be detected or is detected. The output shaft 14 is thereby powered by means of the auxiliary drive device 26 in accordance with the rotational position detected by means of the sensor 28, in particular in such a way that the auxiliary drive device 26 rotates the output shaft 14 in the direction of rotation around the axis of rotation 16 relative to the housing element 12 as long as the start piston is in the intermediate position or in the lower half of its piston stroke.

If, for example, the initially activated internal combustion engine 10 is deactivated, i.e., switched off, then the output shaft 14 runs out, which as part of its run-out or running out comes to a standstill. The powering down of the internal combustion engine 10, in particular the reaching of the standstill of the output shaft, is also referred to as an engine stop. For example, immediately after the engine stop, the sensor 28 detects or identifies a stopped position of the output shaft 14. Stopped position is to be understood as a rotational position of the output shaft 14, wherein the output shaft 14 occupies the stopped position at its standstill or is in the stopped position during its standstill. The sensor 28 provides, for example, a signal, in particular an electrical one, that characterizes the stopped position, which is received by the electronic computing device 24. Depending on the received signal and in particular depending on the detected or identified stopped position, the electronic computing device detects whether the start piston is in the upper half of its piston stroke. In other words, the electronic computing device 24 detects whether the stopped position leads to such a position of the start piston that the start piston is in the upper half of a piston stroke. If it is detected by means of the electronic computing device 24 that the start piston is in the upper half of its piston stroke, then the output shaft 14 is rotated further in the direction of rotation around the axis of rotation 16 relative to the housing element 12 by means of the auxiliary drive device 26, until the start piston is in the lower half of its piston stroke or until the start piston comes to rest or comes to a standstill in the lower half of its piston stroke. It is preferably provided that the start piston, after it has been moved into the lower half of its piston stroke by means of the rotation of the output shaft 14 that was effected by the auxiliary drive device 26, remains in the lower half of its piston stroke at least for a period of time and stays stationary, wherein the period of time is preferably at least 5 seconds, in particular at least 10 seconds and highly preferably at least 30 seconds or several minutes.

Because the start piston is in the lower half of its piston stroke, an especially large volume of the combustion chamber that is partially defined by the start cylinder can be implemented, so that an especially large volume of air or an especially large amount of air can be accommodated in the start cylinder. In this way, an especially large amount of the fuel can be directly injected into the start cylinder during direct starting, so that a reliable ignition and combustion in the start cylinder can be ensured. After the start piston has been moved into the lower half of its piston stroke, i.e., into the previously mentioned intermediate position, the output shaft 14 is for example rotated in a second direction of rotation, that is opposite to the direction of rotation, around the axis of rotation 16 relative to the housing element 12, by means of the auxiliary drive device 26, and is thus rotated back, wherein the start piston is moved out of its intermediate position in the direction of its upper dead center, while the injection of the fuel into the start cylinder as well as an ignition in the start cylinder is preferably omitted and while the start cylinder is free of fuel. Air accommodated in the start cylinder is hereby compressed, wherein after the compression and/or during the compression, i.e., after and/while the start piston is being moved out of the intermediate position in the direction of its upper dead center by means of the auxiliary drive, the fuel is directly injected into the start cylinder and is subsequently ignited in the start cylinder, whereby the internal combustion engine 10 is started by direct starting.

LIST OF REFERENCE CHARACTERS

- 10 Internal combustion engine
- 12 Housing element
- 14 Output shaft
- 16 Axis of rotation
- 18 Exhaust system
- 19 Housing element
- 20 Oil pan
- 22 Temperature sensor
- 24 Electronic computing device
- 26 Auxiliary drive device
- 28 Sensor

The invention claimed is:

1. A method for starting an internal combustion engine (10) of a motor vehicle, comprising the steps of:

detecting before a direct starting of the internal combustion engine (10), wherein an output shaft (14) of the internal combustion engine (10) rotates in a direction of rotation during fired operation for driving the motor vehicle and wherein a fuel is first directly injected into a start cylinder of the internal combustion engine in the direct starting, and while the output shaft (14) is stationary, that a piston which is disposed translationally moveably in the start cylinder is in an upper half of a stroke of the piston or in a middle of the stroke of the piston;

rotating the output shaft (14) by an auxiliary drive device (26) in the direction of rotation in response to the detecting such that the piston is in a lower half of the stroke of the piston and in an intermediate position;

rotating the output shaft (14) by the auxiliary drive device (26) in a second direction of rotation that is opposed to the direction of rotation such that the piston is moved out of the intermediate position in a direction of an upper dead center of the piston and air accommodated in the start cylinder is compressed by the moving of the piston out of the intermediate position in the direction of the upper dead center of the piston; and after or during the moving of the piston out of the intermediate position in the direction of the upper dead center of the piston and the compressing of the air accommodated in the start cylinder, first directly injecting the fuel into the start cylinder and igniting the fuel in the start cylinder to start the internal combustion engine (10) by direct starting.

2. The method according to claim 1, wherein the rotating of the output shaft (14) by the auxiliary drive device (26) in the direction of rotation is less than 360°.

3. The method according to claim 1, wherein the intermediate position is different from a position of a lower dead center of the piston.

4. The method according to claim 3, wherein a translational movement of the piston from the intermediate position into the position of the lower dead center of the piston results in a rotation of the output shaft (14) in the direction of rotation.

5. The method according to claim 1, wherein the rotating of the output shaft (14) by the auxiliary drive device (26) in the second direction of rotation is less than 360°.

6. The method according to claim 1, wherein the auxiliary drive device (26) is an electric motor.

7. The method according to claim 1, wherein the output shaft (14) is rotated by the auxiliary drive device (26) depending on at least one rotational position of the output shaft (14) which is detected by a sensor (28).

* * * * *